United States Patent
McMillan et al.

(10) Patent No.: US 6,954,044 B2
(45) Date of Patent: Oct. 11, 2005

(54) ELECTRIC MOTOR WITH SPEED CONTROL

(75) Inventors: Scott D. McMillan, Golden Valley, MN (US); Greg T. Mrozek, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/735,842

(22) Filed: Dec. 11, 2003

(65) Prior Publication Data

US 2005/0127861 A1 Jun. 16, 2005

(51) Int. Cl.$^7$ ................................................. H02P 1/00
(52) U.S. Cl. ........................ 318/268; 318/138; 318/439; 318/254
(58) Field of Search ................................ 318/268, 254, 318/138, 439, 721, 500, 615, 722, 802, 599, 459, 636; 388/928.1

(56) References Cited

U.S. PATENT DOCUMENTS

| | | | |
|---|---|---|---|
| 4,162,435 A | 7/1979 | Wright | |
| 4,250,435 A | 2/1981 | Alley et al. | |
| 4,371,819 A | 2/1983 | Kaufmann | |
| 4,394,610 A | 7/1983 | Dolland | |
| 4,401,934 A | 8/1983 | Dolland et al. | |
| 4,520,302 A | 5/1985 | Hill et al. | |
| 4,611,157 A | 9/1986 | Miller et al. | |
| 4,642,543 A | 2/1987 | MacMinn | |
| 4,712,050 A | 12/1987 | Nagasawa et al. | |
| 4,772,839 A | 9/1988 | MacMinn et al. | |
| 4,928,043 A | 5/1990 | Plunkett | |
| 5,196,774 A | 3/1993 | Baciak et al. | |
| 5,489,831 A | 2/1996 | Harris | |
| 5,841,252 A | * 11/1998 | Dunfield | 318/254 |
| 6,631,045 B1 | * 10/2003 | Pedrazzini | 360/75 |
| 2003/0075118 A1 | * 4/2003 | Lannes et al. | 122/14.2 |

* cited by examiner

Primary Examiner—Karen Masih
(74) Attorney, Agent, or Firm—Gregory M. Ansems (57) ABSTRACT

An actuator is provided having an electric motor that generates a back emf. The actuator also includes a control system for controlling the speed of the electric motor. The control system includes a controller and circuitry for allowing the controller to sample the back emf of the motor. The controller uses the sampled back emf as feedback representative of motor speed for use in controlling the speed of the motor.

33 Claims, 6 Drawing Sheets

ELECTRIC MOTOR WITH SPEED CONTROL

TECHNICAL FIELD

The present invention relates generally to electric motors. More particularly, the present invention relates to speed control systems for use with electric motors.

BACKGROUND

Electric motors are frequently driven by control systems that monitor and regulate the speed of the electric motors. In the case of a permanent magnet direct current (DC) brush motor, a typical speed control system includes a controller that interfaces with an external speed-sensing element such as an incremental/rotary encoders or a system including magnets and Hall effect sensors for sensing the rotational speed of the motor. The external speed-sensing element provides speed feedback to the controller, which the controller uses to regulate/control the speed of the motor. A problem with the use of external speed sensing elements relates to increased manufacturing cost.

SUMMARY

One aspect of the present invention relates to electric motor speed control systems that do not require external elements for measuring motor speed.

Another aspect of the present invention relates to an electric motor control system that uses the back electromotive force (back emf) generated by the motor to determine the speed of the motor at a given time.

Still another aspect of the present invention relates to a control system for controlling the speed of a permanent magnet DC brush motor. The control system includes circuitry for measuring the back emf generated by the motor. The measured back emf provides feedback representative of the speed of the motor. The control system uses the measured back emf in a speed control algorithm for controlling the speed of the motor.

A further aspect of the present invention relates to a method for regulating speed in a permanent magnet DC brush motor. The method involves periodically deactivating the motor drive circuit and allowing the motor current to decay to zero. Once the current has decayed to zero, the voltage across the motor terminals (i.e., the "back emf") is measured. The back emf provides feedback relating to the motor speed, and is used in combination with a speed control algorithm to control the speed of the electric motor.

Examples of variety of inventive aspects in addition to those described above are set forth in the description that follows. It is to be understood that both the forgoing general description and the following detailed description are exemplary and explanatory only and are not restrictive of the broad inventive aspects that underlie the examples disclosed herein.

DETAILED DESCRIPTION

The present invention relates generally to speed control systems for electric motors. One particular embodiment of the present invention uses the back emf induced in the windings of the rotating motor armature as feedback representative of the speed of the motor. The back emf can be referred to as a counter electromotive force (counter emf) because it opposes or is "counter to" the driving voltage of the motor. The back emf is generated/induced when the coils on the rotating armature of the motor cut the lines of flux generated by the permanent magnets of the motor. The back emf is directly proportional to the speed of the armature and the field strength. In the case of a permanent magnet DC brush motor, the field strength is constant. Thus, the back emf is a direct indicator of the speed of the motor.

Figure 1:
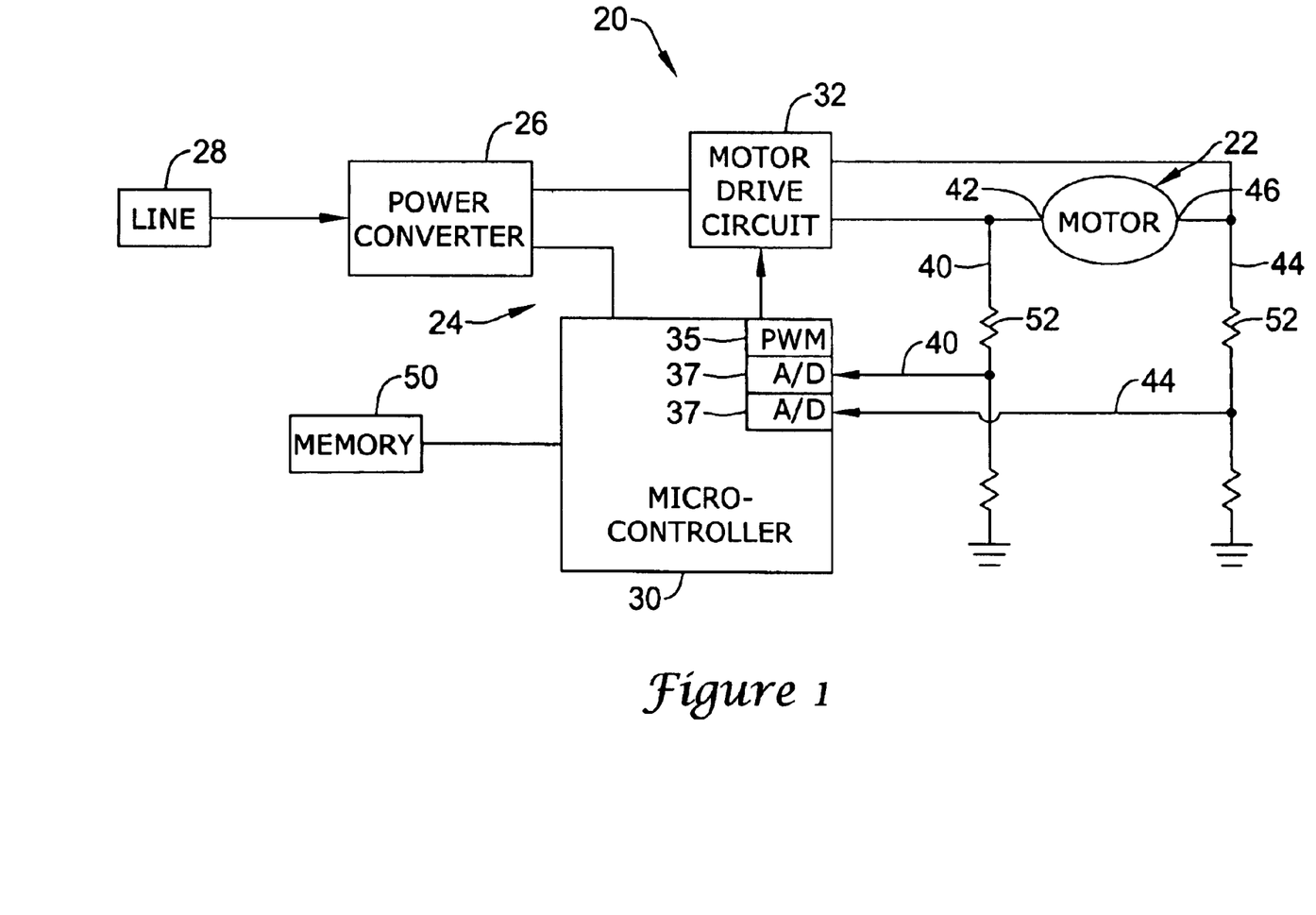
FIG. 1 is a schematic diagram illustrating an actuator having features that are examples of inventive aspects in accordance with the principles of the present disclosure.

FIG. 1 schematically illustrates an actuator 20 having features that are examples of inventive aspects in accordance with the principles of the present disclosure. The actuator 20 includes a motor 22 and a control system 24 for controlling operation of the motor 22. The control system 24 includes a power converter 26 connected to line power 28. The control system 24 also includes a microcontroller 30 that controls a motor drive circuit 32. The microcontroller 30 and the motor drive circuit 32 cooperate to control the electrical current provided to the motor 22. The control system 24 also includes a circuit arrangement for allowing the microcontroller 30 to sample or measure the back emf generated by the motor 22. For example, the control system 24 includes a first line 40 that electrically connects the microcontroller 30 to a first terminal 42 of the motor 22 and a second line 44 that electrically connects the microcontroller 30 to a second terminal 46 of the motor 22. The lines 40, 44 allow the microcontroller 30 to measure the voltage across the motor terminals 42, 46 (e.g., the back emf). As indicated above, the back emf is directly proportional to the rate of rotation of the motor armature. Thus, by measuring the back emf, the microcontroller is provided with feedback representative of the rate of rotation of the motor armature. This motor speed feedback information can then be used by the microcontroller 30 in a speed control algorithm to control the speed of the motor 22. An example speed control algorithm includes a conventional proportional, integral and derivative (PID) control algorithm.

The power converter 26 preferably provides DC voltage to the motor 22 and the control system 24. In certain embodiments, the power converter 26 can be configured to convert 110-volt alternating current or 24-volt alternating current to direct current for use by the control system 24 and the motor 22.

The motor drive circuit 32 can have any number of conventional configurations. For example, the drive circuit 32 can include one or more switches for selectively turning-on and turning-off the impressed current/voltage provided to the motor 22. The operation of the switches can be controlled by a pulse width modulator 35 (PWM) associated with the microcontroller 30. The speed of the motor 22 can be controlled by varying the duty cycle of the pulse width modulation. The pulse width modulation frequency typically ranges from 10 to 20 kilohertz.

The microcontroller 30 controls the motor drive circuit 32, which in turn controls the speed of the motor 22. Lines 40, 42 provide feedback to the microcontroller 30 for determining the speed of the motor 22 at a given time. The microcontroller 30 can include analog to digital converters 37 (A/D converters) for sampling the voltages provided at lines 40, 44. As indicated above, the microcontroller 30 can also include a pulse width modulator 35 for controlling the motor drive circuit 32. Moreover, the microcontroller 30 preferably accesses memory 50 in which information such as speed control algorithms or other control algorithms are stored.

The lines 40, 44 are preferably relatively inexpensive electrically conductive elements. For example, the lines 40, 44 can include electrical wires, tracings provided on circuit board or other electrically conductive elements. As shown in FIG. 1, resistors 52 are provided along the lines 40, 44 for scaling down the voltage values provided to the A/D converters of the microcontroller 30.

In operation of the system, the microcontroller 30 controls the motor drive circuit 32 and thus the motor 22 by virtue of a speed control algorithm such as a conventional PID control algorithm. The microcontroller 30 accesses feedback relating to the speed of the motor by sampling the voltages at lines 40 and 44. To sample the voltages, the drive circuit 32 is turned-off to allow the motor current to decay to zero. The time necessary for the current to decay to zero is dependent upon the motor inductance, resistance, and maximum current. In one particular embodiment, this time period is about 0.5 milliseconds. Once the motor current decays to zero, the voltage at the motor terminals 42, 46 is sampled/measured. The difference between the two voltage measurements (i.e., the back emf) is directly proportional to the rotational speed of the armature of the motor 22. The polarity of this measured value corresponds to the rotational direction of the armature. After the voltage has been measured, the drive circuit 32 is turned back on so that the motor can again supply torque to a load coupled to the motor shaft. In one embodiment, back emf sampling occurs at least every 40 milliseconds. In another embodiment, back emf sampling occurs at least every 30 milliseconds. In still another embodiment, counter emf sampling occurs at least every 20 milliseconds.

During sampling, the drive circuit is typically turned off for a period longer than the duration of the off-time period of the duty cycle of the pulse width modulation. In one embodiment, the drive circuit is turned off for at least 1 millisecond to allow for current decay and sampling of the back emf. For another embodiment, the drive circuit is turned off for at least 2 milliseconds to allow for current decay and sampling of the back emf. For still another embodiment, the drive circuit is turned off for at least 3 milliseconds to allow for current decay and sampling of the back emf.

Figure 5:
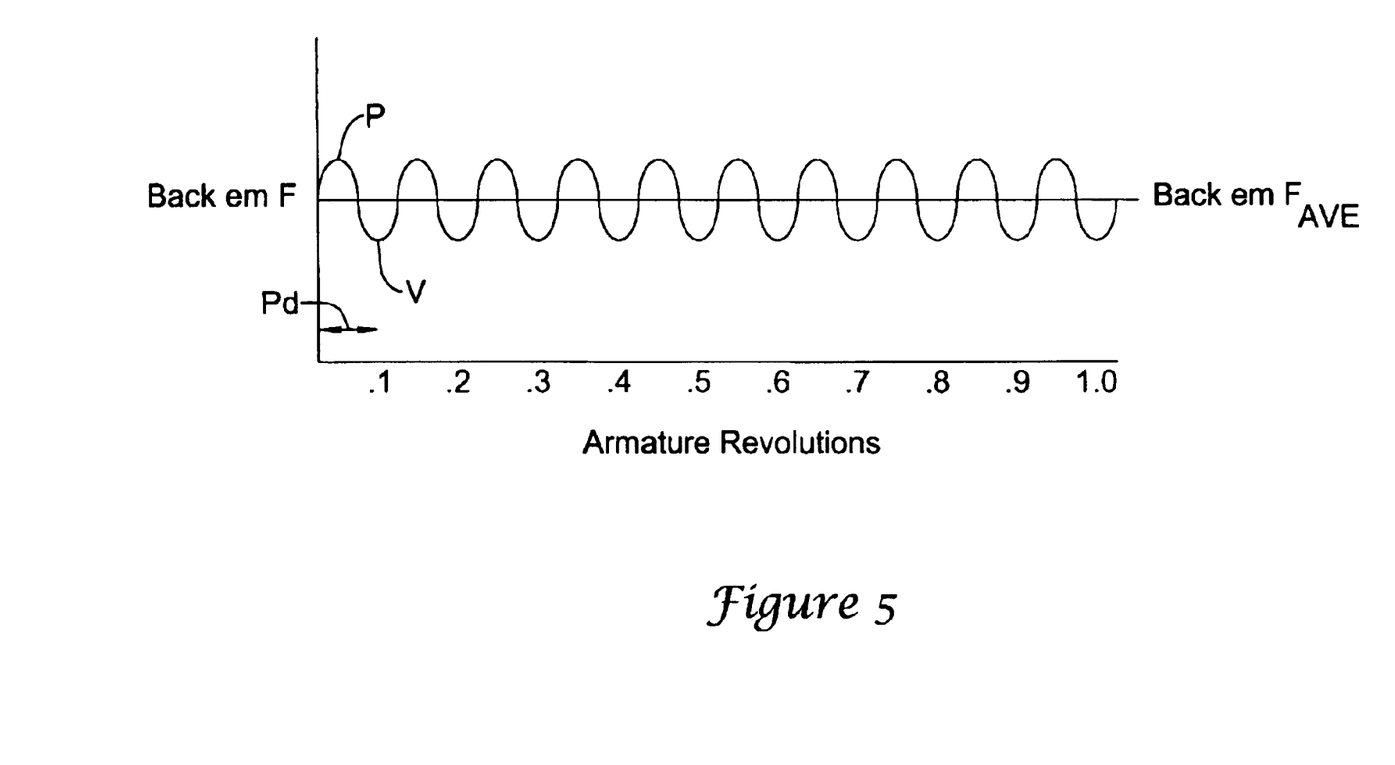
FIG. 5 is a graph plotting a sinusoidal curve representative of the back emf generated by an example permanent magnet DC brush motor.

It will be appreciated that a variety of sampling techniques can be used. For example, for certain classes of electric motors, the back emf can be sampled once every sampling period. However, merely taking a single back emf sample every sampling period can have shortcomings when applied to certain classes of low cost DC brush motors. The shortcomings relate to the fact that low cost DC brush motors are typically two pole motors with only 3, 5, or 7 commutator bars. This results in a back emf waveform that is not a pure DC voltage at a constant speed. Instead, the back emf is typically a sinusoidal-waveform. FIG. 5 shows the back emf waveform for a DC brush motor having 5 commutator bars. As shown in FIG. 5, the 5 commutator bars generate 10 waveform periods P per rotation of the motor armature. Each waveform period corresponds to one wavelength of the waveform. The sinusoidal waveform is shown superimposed over the average back emf.

In certain cases, the magnitude of the waveform may vary by 10% or more from peak P to valley V. Thus, if only a single sample is measured, and the sample happens to be taken near the peak P or valley V of a given waveform, an inaccurate speed-reading will be generated. Such inaccuracies, when inserted into the speed control algorithm, can result in unstable speed control.

Figure 6:
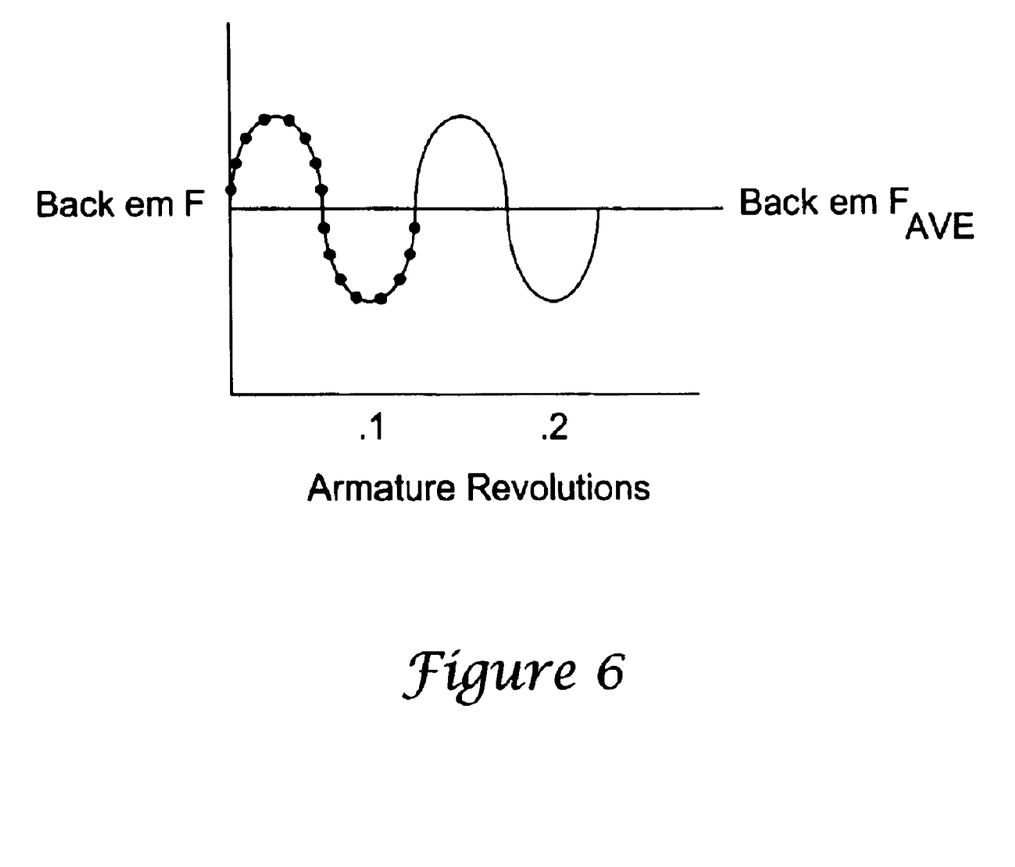
FIG. 6 shows an enlarged portion of the graph of FIG. 6 with dots indicating a plurality of back emf sample locations within a given commutation period.

A method for avoiding this problem is to sample the back emf generated by the motor a number of times during each commutation period Pd, and using an average of these readings to determine the motor speed. In one embodiment, the back emf can be sampled at least 4 times per commutation period. In another embodiment, the back emf can be sampled at least 8 times per commutation period. In still another embodiment, the back emf can be sampled at least 12 times per commutation period. In a preferred embodiment, the back emf is sampled at least 16 times over a given commutation period. FIG. 6 (illustrates an example where the back emf is sampled 16 times (indicated by dots provided on the waveform) over the wavelength of a given commutation period.

It will be appreciated that the commutation period will vary from motor to motor and will also vary with the rotational speed of the motor. In one embodiment of the present invention, the commutation period was estimated to be at least 2.5 milliseconds. Thus, assuming the time period for the current to decay to zero once the drive circuit is turned off is about 0.5 milliseconds, the drive circuit is preferably turned off for a period of at least 3 milliseconds to allow for current decay and a sampling period.

While it is preferred to take multiple readings per a given commutation period, in alternative embodiments, other types of averaging techniques may be utilized to stabilize the sampled speed feedback. The general concept is to use the average of multiple readings as a speed feedback input into a speed control algorithm, as opposed to inputting a single reading into the speed control algorithm.

Variations in the manufacturing process for electric motors can result in motors whose back emf constant varies by plus or minus 10%, or more, from motor to motor. To overcome this problem, it may be desirable to calibrate the actuator 20 as part of the manufacturing process. This can be accomplished by running the actuator 20 with a nominal value in place for the speed command. The rotational speed of the armature of the motor is measured with an external device, and a new speed command is calculated that will cause the actuator to run at the desired speed. The calculation can be accomplished with the following formula:

new speed command/desired speed=nominal speed command/measured speed.

Figure 2:
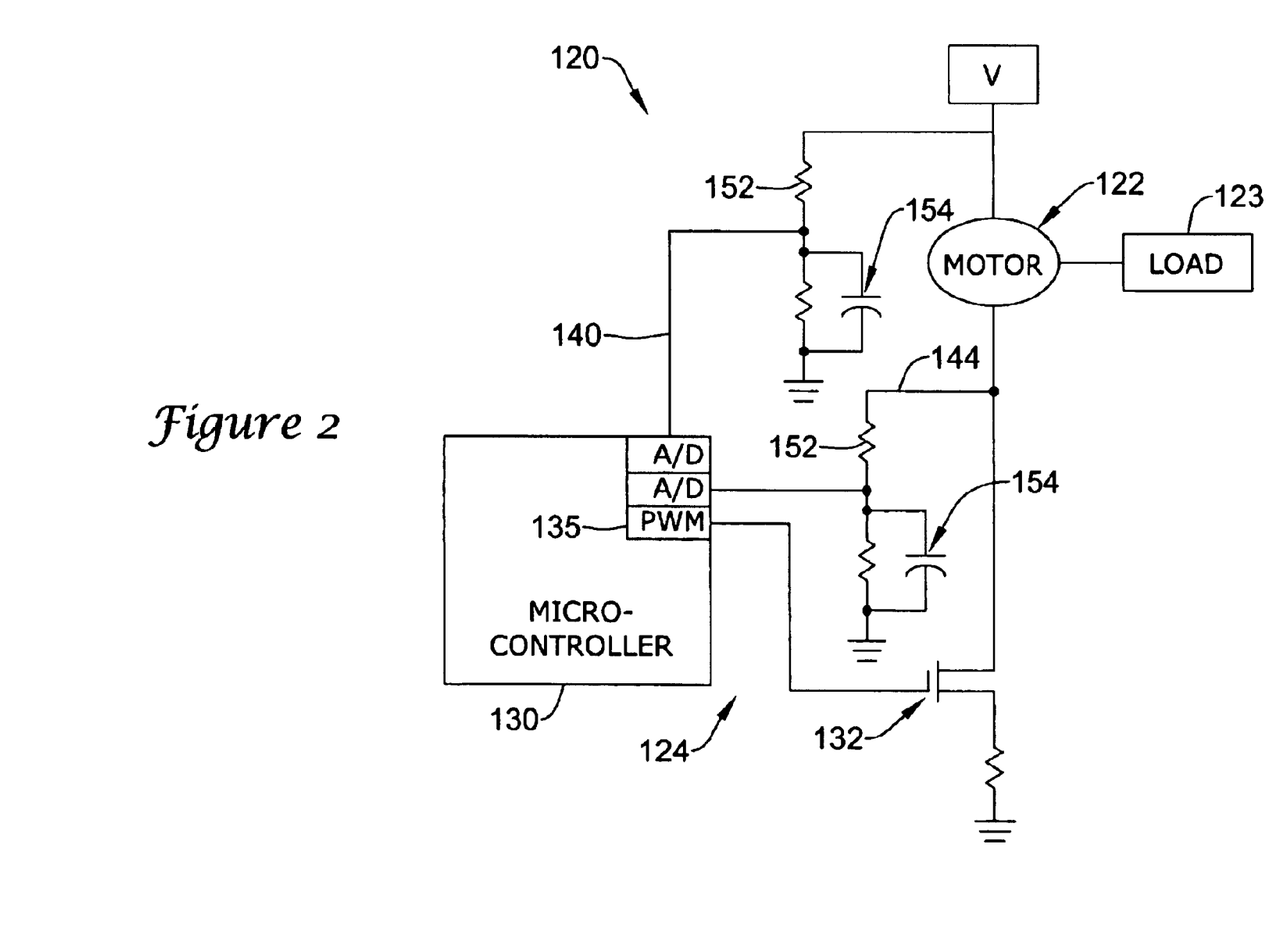
FIG. 2 a circuit diagram of another actuator having features that are examples of inventive aspects in accordance with the principles of the present disclosure.

FIG. 2 illustrates a unidirectional actuator 120 having features that are examples of inventive aspects in accordance with the principles of the present disclosure. The actuator 120 includes an electric motor 122 and a control system 124. The motor 122 preferably includes a shaft adapted to supply torque to a load 123 such as a damper used to control air flow through one or more ventilation ducts, or a valve, such as a hydronic valve, used to control the flow of liquid or gas through a pipe. The control system includes a microcontroller 130 and a motor drive circuit in the form of a switch 132. The microcontroller 130 and the switch 132 (e.g., a MOSFET) cooperate to control the speed of the motor 122. For example, the controller 130 includes a pulse with modulator 135 for opening and closing the switch 132 to control the current provided to the motor 122. Feedback relating to motor speed is provided to the microcontroller 130 by lines 140 and 144, which allow the microcontroller to measure the back emf generated by the motor 122. Lines 140 and 144 each include a resistor 152 for scaling down the voltage values provided to the microcontroller 130. Capacitors 154 are also provided along the lines 140 and 144 for providing a filtering function. It will be appreciated that the microcontroller 130 can be adapted to sample the back emf generated by the motor 122 in a manner similar to the methods described with respect to the embodiment of FIG. 1.

Figure 3:
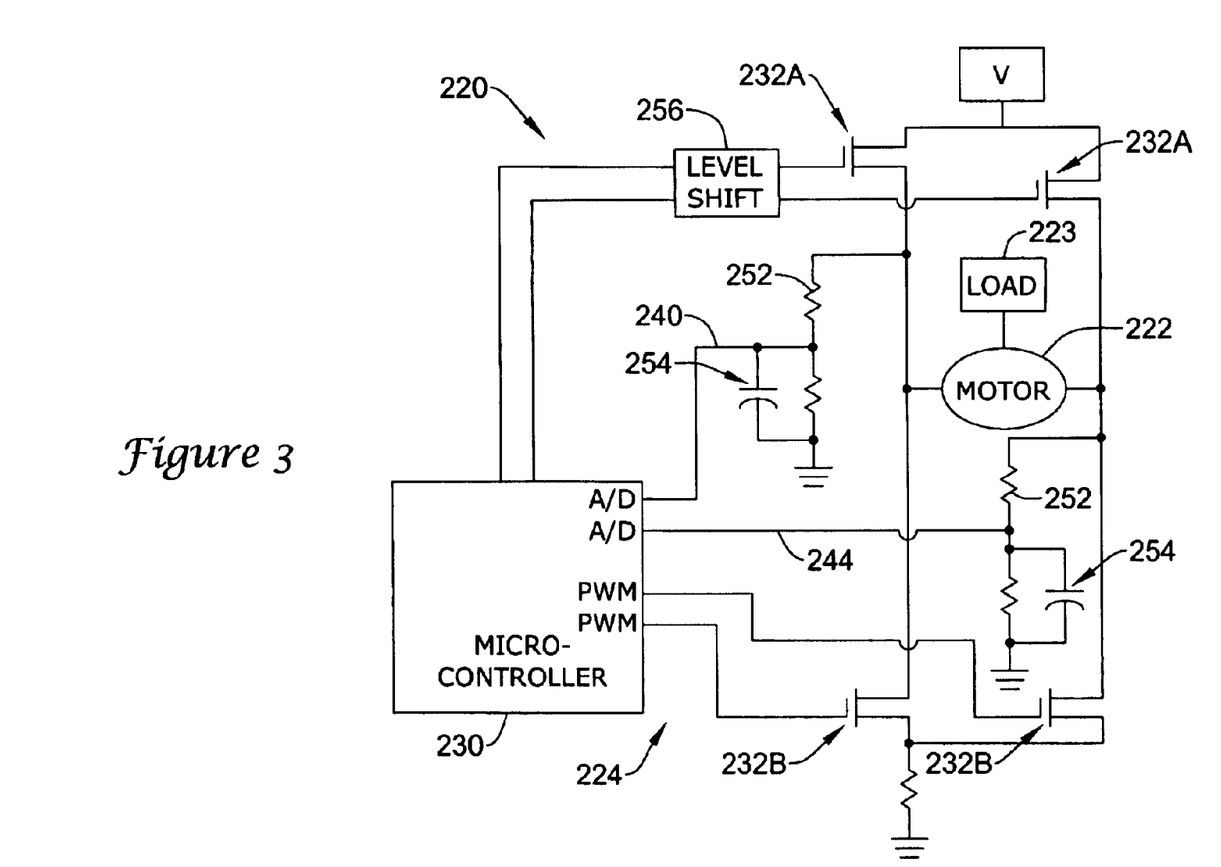
FIG. 3 is a circuit diagram of still another actuator having features that are examples of inventive aspects in accordance with the principles of the present disclosure.

FIG. 3 shows a bi-directional actuator 220 having features that are examples of inventive aspects in accordance with the principles of the present disclosure. The actuator 220 includes a motor 222 controlled by a control system 224. The motor 222 is adapted to be coupled to a load 223 so as to transfer torque to the load. Example loads include the damper vanes, valves or other structures. The control system 224 includes a microcontroller 230 and a drive circuit in the form of two high side switches 232A (e.g., p-channel MOSFETs) and two low side switches 232B (e.g., n-channel MOSFETs). A level shift 256 can be provided to convert an output of the micro controller 232, typically approximately 5 volts, to a higher voltage needed to switch the high side switches 232A. Lines 240 and 242 are provided for allowing the microcontroller 232 to sample the back emf generated by the motor 222. Resistors 252 are provided along the lines 240 and 244, and capacitors 254 are also provided along the lines 240, 244 for providing a filtration function. It will be appreciated that the microcontroller 230 can be configured to sample the back emf generated by the motor 222 in a manner similar to the methods described with respect to the embodiment of FIG. 1.

Figure 4:
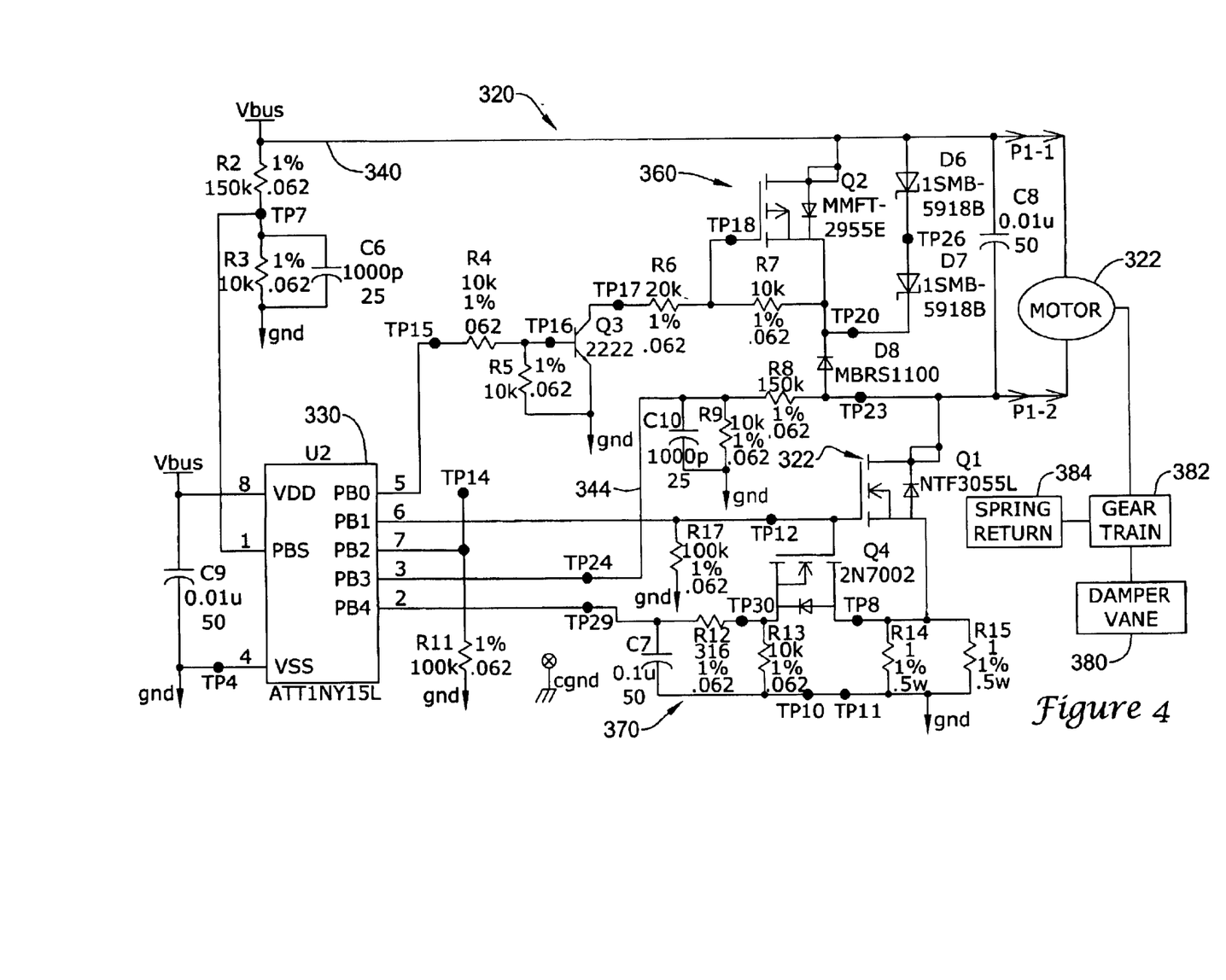
FIG. 4 is a circuit diagram of a damper assembly having features that are examples of inventive aspects in accordance with the principles of the present disclosure.

FIG. 4 shows a damper assembly preferably used to control air flow as part of a heating, ventilating and air conditioning (HVAC) system, such as an HVAC system in an office building, warehouse, residence or other building structure. The damper assembly incorporates a unidirectional actuator 320 having features that are examples of inventive aspects in accordance with the principles of the present disclosure. The actuator 320 includes an electric motor 322 (e.g., a permanent magnet DC brush motor), a microcontroller 330 for controlling the electric motor 332, and a motor drive circuit including a switch 332 (e.g., a MOSFET) controlled by a pulse width modulator of the controller 330. The actuator 320 also includes back emf sampling lines 340, 344. The actuator 320 further includes braking circuitry 360 as well as current sampling circuitry 370. The current sampling circuitry 370 is adapted for allowing microcontroller 332 to sample the motor current to provide feedback for regulating the torque output of the motor. Further details regarding this current sampling circuitry can be found in U.S. patent application Ser. No. 10/423,029 entitled CURRENT CONTROL LOOP FOR ACTUATOR AND METHOD, which was filed on Jul. 5, 2003, and is hereby incorporated by reference in its entirety.

Referring still to FIG. 4, the actuator 320 is shown with the motor 322 coupled to a damper vane 380 through an intermediate gear train 382. For example, a shaft of the motor preferably drives the gear train 382, which provides gear reduction, which assists in efficiently driving the damper vane 380. The actuator 320 is adapted to drive the damper vane 380 from a first position (e.g., a closed position) and a second position (e.g., an open position). A spring return 384 is provided for mechanically moving the damper vane 380 from the second position back to the first position. The controller 330, by utilizing back emf feedback provided through lines 340, 344, controls the speed the damper vane 380 is moved from the first position to the second position.

With regard to the forgoing description, changes may be made in detail, especially with regard to the shape, size and arrangement of the parts. It is intended that the specification and depicted aspects be considered illustrative only and not limiting with respect to the broad underlying concepts of the present disclosure.

We claim:

1. An actuator comprising:
    a rotating electric motor having a rotating armature, two or more magnets, and one or more coils, wherein a back emf is generated when the one or more coils pass through the lines of flux of the two or more magnets, the back emf varying during each commutation period of the motor;
    a control system for controlling the speed of the motor, the control system including:
    a controller;
    circuitry for allowing the controller to obtain a measure that is related to an average back emf over at least one commutation period of the motor, wherein the controller uses the measure that is related to the average back emf as feedback representative of motor speed for use in controlling the speed of the motor.

2. The actuator of claim 1, further comprising a motor drive circuit for driving the motor, wherein the controller turns off the motor drive circuit and allows current at the motor to decay to zero before obtaining the measure that is related to the average back emf.

3. The actuator of claim 2, wherein the controller includes a pulse width modulator for controlling the motor drive circuit, the pulse width modulator providing a duty cycle having an on-time and an off-time.

4. The actuator of claim 3, wherein the motor drive circuit is turned off for a period of time greater than the off-time of the duty cycle.

5. The actuator of claim 2, wherein the motor drive circuit is turned off for at least 2 ms to allow for current decay and for sampling.

6. The actuator of claim 5, wherein the motor drive circuit is turned off for at least 3 ms to allow for current decay and for sampling.

7. The actuator of claim 1, wherein the controller uses the circuitry to sample multiple back emf values during at least one commutation period of the motor, and uses an average of the multiple back emf values as feedback representative of motor speed.

8. The actuator of claim 1, wherein the electric motor includes a permanent magnet DC brush motor.

9. The actuator of claim 8, wherein the permanent magnet brush motor generates a back emf having a waveform and wherein the controller uses the circuitry to sample multiple back emf values over a time period corresponding generally to one wavelength of the waveform.

10. The actuator of claim 9, wherein the controller uses an average of the sampled back emf values as feedback representative of motor speed.

11. The actuator of claim 9, wherein the controller uses the circuitry to sample at least 4 back emf values over a time period corresponding to one wavelength of the waveform.

12. The actuator of claim 9, wherein the controller uses the circuitry to sample at least 8 back emf values over a time period corresponding to one wavelength of the waveform.

13. The actuator of claim 9, wherein the controller uses the circuitry to sample at least 16 back emf values over a time period corresponding to one wavelength of the waveform.

14. The actuator of claim 1, wherein the motor is coupled to a damper vane.

15. The actuator of claim 1, wherein the motor is coupled to a valve.

16. The actuator of claim 1, wherein the motor includes first and second terminals, and wherein the circuitry for allowing the controller to obtain the measure that is related to the average back emf of the motor includes a first conductive line that electrically connects the first terminal to the controller and a second conductive line that electrically connects the second terminal to the controller.

17. The actuator of claim 16, wherein the first and second conductive lines each include at least one resistor.

18. The actuator of claim 17, wherein the first and second conductive lines each include at least one capacitor.

19. A fluid flow control assembly comprising:
    a permanent magnet DC brush motor that generates a back emf, wherein the back emf varies during each commutation period of the motor;
    a controller, the controller adapted to obtain a measure that is related to an average of the back emf over at least one commutation period of the motor, the controller further adapted to use the measure that is related to the average of the back emf as feedback representative of motor speed for use in controlling the speed of the motor; and
    a fluid flow control structure coupled to the motor.

20. The assembly of claim 19, wherein the fluid flow control structure includes a damper vane.

21. The assembly of claim 19, wherein the fluid flow control structure includes a valve.

22. The assembly of claim 19, further comprising a motor drive circuit for driving the motor, wherein the controller turns off the motor drive circuit and allows current at the motor to decay to zero before obtaining the measure that is related to the average of the back emf of the motor.

23. The assembly of claim 22, wherein the motor drive circuit is turned off for at least 2 ms to allow for current decay and for obtaining the measure that is related to the average of the back emf of the motor.

24. The assembly of claim 23, wherein the motor drive circuit is turned off for at least 3 ms to allow for current decay and for obtaining the measure that is related to the average of the back emf of the motor.

25. The assembly of claim 19, wherein the controller samples multiple back emf values and uses an average of the back emf values as feedback representative of motor speed.

26. A method for controlling the speed of a permanent magnet DC brush motor, the method comprising;
    supplying current to the motor to drive the motor at a first speed;
    terminating the supply of current to the motor such that the current decays to zero;
    after the current decays to zero, obtaining a measure that is related to an average of the back emf generated by the motor over at least one commutation period of the motor; and
    inputting the measure that is related to an average of back emf into a speed control algorithm for controlling the speed of the motor, the measured back emf being representative of the first speed.

27. The method of claim 26, further comprising re-supplying current to the motor after the back emf has been measured.

28. The method of claim 26, further comprising measuring the back emf by taking multiple discrete back emf measurements while the supply of current is terminated, and inputting an average of the back emf measurements into the speed control algorithm.

29. The method of claim 28, wherein the back emf measurements are taken over a time period greater than 2 milliseconds.

30. The method of claim 28, wherein the back emf generates a waveform, and wherein the multiple back emf measurements are taken within a time period corresponding generally to one wavelength of the waveform.

31. A method for calibrating a speed control system for an electric motor, the method comprising:
    running the motor using a nominal value as a speed command;
    measuring the motor speed generated by the nominal value; and
    using the ratio of the nominal value and the measured speed to calibrate the speed control system with respect to the motor.

32. An actuator comprising:
    an electric motor that generates a back emf with a generally repeating waveform; and
    a controller, the controller adapted to obtain a measure that is related to an average back emf of the motor over a time period corresponding generally to at least one wavelength of the waveform, the controller further adapted to use the measure that is related to the average back emf to control the speed of the motor.

33. A method for controlling the speed of an electric motor, the method comprising:
    supplying current to the motor to drive the motor at a first speed, the supply current being driven at a frequency that corresponds to the first speed with current peaks and current valleys;
    suspending the supply of current such that at least one current peak and/or current valley is skipped;
    while the supply of current is suspended, allowing the current to decay to zero or substantially zero and then obtaining a measure of the back emf generated by the motor, and
    using the measure of the back emf as feedback to control the speed of the motor.

* * * * *